(Model.)
W. WINSPEAR.
Shoulder Protector for Horses.
No. 240,488. Patented April 19, 1881.
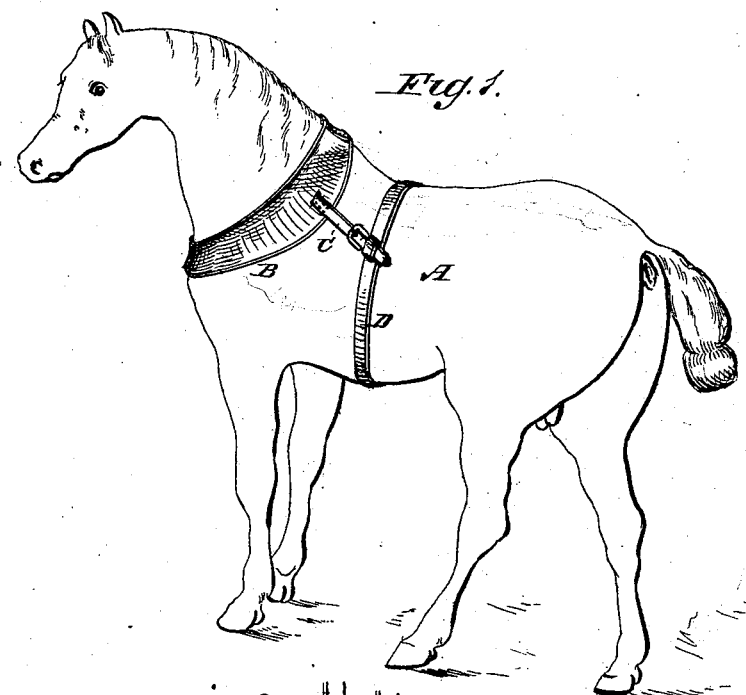
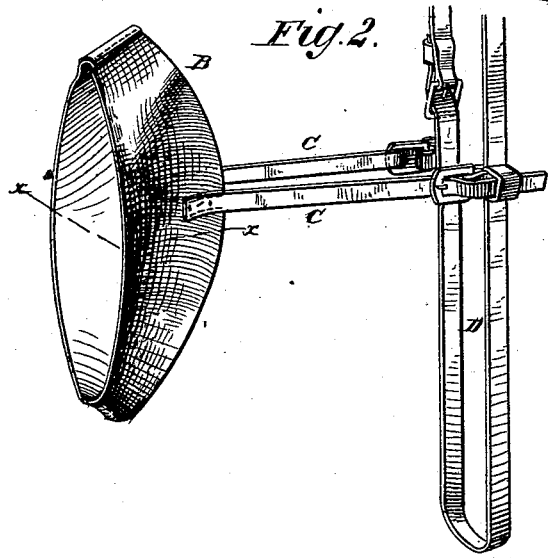
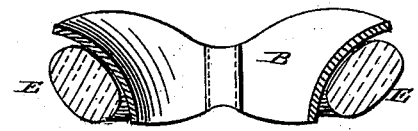
WITNESSES:
INVENTOR:
W. Winspear
BY Munn & Co
ATTORNEYS.

UNITED STATES PATENT OFFICE.

WHEELOCK WINSPEAR, OF MOUNT PISGAH, OHIO.

SHOULDER-PROTECTOR FOR HORSES.

SPECIFICATION forming part of Letters Patent No. 240,488, dated April 19, 1881.

Application filed September 18, 1880. (Model.)

*To all whom it may concern:*

Be it known that I, WHEELOCK WINSPEAR, of Mount Pisgah, Clermont county, Ohio, have invented a new and Improved Shoulder-Protector for Horses, of which the following is a specification.

The object of this invention is to provide an improved anti-chafing gear for horses and mules, and thereby relieve and prevent much disease and suffering.

The invention consists of an endless band, of leather or other suitable substance, shaped to fit upon the shoulders and neck of the animal, beneath the collar, and held in place by attached straps that buckle to the surcingle.

Figure 1 is a perspective view of a horse with my improved protector attached. Fig. 2 is an enlarged perspective view of the protector and surcingle. Fig. 3 is a transverse section, on line $x\ x$, Fig. 2, of the protector, showing its position between a horse-collar and a horse's shoulder.

Similar letters of reference indicate corresponding parts.

In the drawings, A represents a horse.

B is the protector, consisting of a strip of leather formed into a broad endless band of the general shape of a horse-collar, and shaped to fit snugly on and about the neck and shoulders of the horse A, to cover those parts upon which a horse-collar usually rests.

C C are straps secured to the opposite sides of said protector B, at the rear edge thereof, whereby said protector B is held in place on the horse A by the buckling of said straps C C to a surcingle, D, that is passed around the body of the horse A, as shown.

In Fig. 3 is shown a section of the lower part of a horse-collar, E, pressing or bearing against the outside of the protector B, wherein are seen the relative positions of the protector B and collar E on a horse's neck.

By preventing the chafing of the collar upon the horse this protector prevents sores and bruises, and thereby diseases incident thereto, and it also keeps the sweat of a horse from off the collar, and thereby makes the collar last longer.

With a protector, B, properly fitted to the shape of the horse, a horse otherwise disabled by collar chafes and sores can be put to work without susceptible retardation of the healing of said wounds.

The special advantages of this protector are, that it fits closely, evenly, and without chafing on the horse's neck and shoulders, is of such a texture as to best resist the action of the collar without injury to the animal, and is simple, cheap, and durable, and readily adjustable.

Having thus described my invention, I claim as new and desire to secure by Letters Patent—

An improved protector for horses, consisting of an endless strip of leather shaped to fit the neck and shoulders of a horse, adapted to be worn underneath the collar, and provided with straps adapted to secure the protector to the surcingle or back-strap of the harness, all substantially as and for the purpose set forth.

WHEELOCK WINSPEAR.

Witnesses:
MADISON EPPERT,
ICH. N. MEDDREL.